(12) United States Patent
Kachi et al.

(10) Patent No.: US 12,253,040 B2
(45) Date of Patent: Mar. 18, 2025

(54) VEHICLE CONTROLLER AND VEHICLE CONTROL METHOD

(71) Applicant: TOYOTA JIDOSHA KABUSHIKI KAISHA, Aichi-ken (JP)

(72) Inventors: Masahiro Kachi, Nagakute (JP); Takehiro Komatsu, Toyota (JP); Tomohiro Nakano, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 136 days.

(21) Appl. No.: 18/167,892

(22) Filed: Feb. 13, 2023

(65) Prior Publication Data

US 2023/0265809 A1    Aug. 24, 2023

(30) Foreign Application Priority Data

Feb. 18, 2022   (JP) ................ 2022-023461

(51) Int. Cl.
*F02D 41/00* (2006.01)
*F02D 41/22* (2006.01)
*F02D 41/24* (2006.01)

(52) U.S. Cl.
CPC ....... *F02D 41/2493* (2013.01); *F02D 41/009* (2013.01); *F02D 41/22* (2013.01); *F02D 41/2451* (2013.01); *F02D 41/222* (2013.01)

(58) Field of Classification Search
CPC .. F02D 41/009; F02D 41/222; F02D 41/2493; F02D 41/22; F02D 41/2451
See application file for complete search history.

(56) References Cited

U.S. PATENT DOCUMENTS

2012/0303251 A1* 11/2012 Shimizu ................ F02D 41/009
                                                     701/113
2014/0060486 A1*  3/2014 Maezawa ............... F02D 45/00
                                                     123/350

FOREIGN PATENT DOCUMENTS

| JP | 2007327427 A | 12/2007 |
| JP | 201237357 A  | 2/2012  |
| JP | 2013199857 A | 10/2013 |

\* cited by examiner

*Primary Examiner* — Gonzalo Laguarda
(74) *Attorney, Agent, or Firm* — HAUPTMAN HAM, LLP

(57) ABSTRACT

A vehicle controller includes processing circuitry configured to execute a counter updating process, first and second starting processes, and a resetting process. The resetting process includes resetting the crank counter when a crank counter has a value outside of a range corresponding to a tooth-missing portion in a case in which a magnitude of a difference obtained by subtracting a value of a pre-update crank counter from the value of the crank counter that was increased by receiving the pulse signal in the counter updating process is greater than a first threshold value corresponding to a specified angle. The resetting process further includes resetting the crank counter when the crank counter has a value within the range corresponding to the tooth-missing portion in a case in which the magnitude of the difference is greater than a second threshold value that is greater than the first threshold value.

7 Claims, 5 Drawing Sheets ed value of the crank counter based on the stored crank angle will be unsuitable

VEHICLE CONTROLLER AND VEHICLE CONTROL METHOD

RELATED APPLICATIONS

The present application claims priority of Japanese Patent Application No. 2022-023461 filed Feb. 18, 2022, the disclosure of which is hereby incorporated by reference herein in its entirety.

1. FIELD

The present disclosure relates to a vehicle controller and a vehicle control method that control a vehicle equipped with an engine.

2. DESCRIPTION OF RELATED ART

A disk-shaped signal rotor is coupled to a crankshaft of an engine. On the outer edge of the signal rotor, teeth are each arranged at a predetermined angle. The outer edge of the signal rotor includes a tooth-missing portion having a longer tooth interval than the other portions.

The crank position sensor is coupled so as to face the outer edge of the signal rotor.

A typical crank position sensor includes sensor units that send a pulse signal each time a tooth of the signal rotor passes; specifically, the position sensor includes a first sensor unit and a second sensor unit that each send a signal, the phase of the signal sent from the first sensor unit being shifted from the phase of the signal sent from the second sensor unit. When the crankshaft rotates forward, the output signal of the first sensor unit is at a Hi level and the output signal of the second sensor unit is changed from the Hi level to a Lo level. When such a combination of the signals sent from the sensor units is established, a pulse signal having a relatively short pulse width is sent from the crank position sensor.

When the crankshaft rotates backward, the output signal of the first sensor unit is at the Hi level and the output signal of the second sensor unit is changed from the Lo level to the Hi level. When such a combination of the signals sent from the sensor units is established, a pulse signal having a relatively long pulse width is sent from the crank position sensor.

Such a crank position sensor is capable of obtaining a crank angle, which is a rotation angle of the crankshaft by counting the sent pulse signal. Further, the crank position sensor is capable of recognizing the rotation direction of the crankshaft based on the pulse width of the sent pulse signal. This allows the crank angle to be detected in consideration of backward rotation of the crankshaft.

When a stop condition is satisfied, a typical vehicle controller automatically stops the engine. When a restart condition is satisfied, the vehicle controller executes an automatic stop restart control that automatically starts the engine. The vehicle controller stores a crank angle obtained when the engine automatically stops. When the engine automatically starts, the vehicle controller sets fuel injection timings and ignition timings of cylinders based on the stored crank angle. This allows the automatic start to be completed quickly.

The crank angle detected by the vehicle controller may be shifted from an actual crank angle. In this case, the fuel injection timings and the ignition timings set by the vehicle controller based on the stored crank angle will be unsuitable for starting the engine. As a result, the engine may fail to be restarted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a vehicle controller that controls a vehicle equipped with an engine. The engine includes a signal rotor and a crank position sensor. The signal rotor includes teeth each arranged at a specified angle on an outer edge of the signal rotor and includes a tooth-missing portion where the teeth are missing on a part of the outer edge. The crank position sensor faces the outer edge of the signal rotor coupled to a crankshaft of the engine. The crank position sensor sends a pulse signal each time one of the teeth passes. The crank position sensor sends the pulse signal having a pulse width that differs depending on whether the crankshaft is rotating forward or backward.

The vehicle controller includes processing circuitry configured to execute a counter updating process that increases and updates a crank counter when receiving the pulse signal from the crank position sensor and corrects, when determining that the crankshaft is rotating backward based on the pulse width of the pulse signal, the crank counter so as to set the crank counter to be smaller than a pre-update crank counter.

In a case in which a value of the crank counter obtained when the engine was stopped is not stored, the processing circuitry is configured to execute a first starting process that starts the engine by setting fuel injection timings and ignition timings of cylinders of the engine after a crank angle is identified during cranking so that the crank counter is allowed to be updated. In a case in which the value of the crank counter obtained when the engine was stopped is stored, the processing circuitry is configured to execute a second starting process that starts the engine by setting the fuel injection timings and the ignition timings of the cylinders of the engine based on the stored value of the crank counter.

The processing circuitry is configured to execute a resetting process that resets the crank counter when the crank counter has a value outside of a range corresponding to the tooth-missing portion in a case in which a magnitude of a difference obtained by subtracting a value of the pre-update crank counter from the value of the crank counter that was increased by receiving the pulse signal in the counter updating process is greater than a first threshold value corresponding to the specified angle, and resets the crank counter when the crank counter has a value within the range corresponding to the tooth missing portion in a case in which the magnitude of the difference is greater than a second threshold value that is greater than the first threshold value.

The processing circuitry compares the increase amount of the crank counter with the threshold value when the crank counter is increased based on the fact that the pulse signal has been received. When the increase amount is greater than the threshold value, the processing circuitry resets the crank counter. This allows the processing circuitry to determine that the crank counter has a value shifted from an actual crank angle. Then, the processing circuitry resets the incorrect crank counter. In this manner, the processing circuitry prevents the engine from being started in a state in which the fuel injection amount and the ignition timing of each cylinder is set based on an incorrect crank counter.

Accordingly, the processing circuitry prevents situations in which the engine fails to start. When receiving the pulse signal in a case in which the crank angle is within the range that corresponds to the tooth-missing portion, the processing circuitry executes the counter updating process to increase the crank counter. Thus, in a case in which a first threshold value is compared with the increase amount of the crank counter, the processing circuitry resets the crank counter even if the crank counter is not shifted from an actual crank angle. To solve this problem, the processing circuitry uses a second threshold value that is greater than the first threshold value when the crank counter has a value within the range that corresponds to the tooth-missing portion. When the increase amount of the crank counter is greater than the second threshold value, the processing circuitry resets the crank counter. Thus, the vehicle controller prevents the crank counter from being reset although the crank counter is not shifted from an actual crank angle. Accordingly, the vehicle controller prevents the engine from failing to be started while allowing for the execution of the second starting process using the value of the stored crank counter.

In the above aspect, the teeth include two teeth that are respectively located on opposite sides of the tooth-missing portion, and the second threshold value is a value corresponding to a crank angle obtained from when one of the two teeth is detected by the crank position sensor to when the other one of the two teeth is detected by the crank position sensor.

In a case in which the second threshold value is excessively large, the second starting process is executed without resetting the crank counter even if the value of the updated crank counter is shifted from an actual crank angle.

In the above configuration, the processing circuitry executes the second starting process only when the crank counter is updated properly.

That is, the vehicle controller more properly prevents the engine from failing to be started.

Another aspect of the present disclosure provides a method for controlling a vehicle equipped with an engine. The engine includes a signal rotor and a crank position sensor. The signal rotor includes teeth each arranged at a specified angle on an outer edge of the signal rotor and includes a tooth-missing portion where the teeth are missing on a part of the outer edge. The crank position sensor faces the outer edge of the signal rotor coupled to a crankshaft of the engine. The crank position sensor sends a pulse signal each time one of the teeth passes. The crank position sensor sends the pulse signal having a pulse width that differs depending on whether the crankshaft is rotating forward or backward. The method includes: increasing and updating a crank counter when receiving the pulse signal from the crank position sensor and corrects, when determining that the crankshaft is rotating backward based on the pulse width of the pulse signal, the crank counter so as to set the crank counter to be smaller than a pre-update crank counter; in a case in which a value of the crank counter obtained when the engine was stopped is not stored, starting the engine by setting fuel injection timings and ignition timings of cylinders of the engine after a crank angle is identified during cranking so that the crank counter is allowed to be updated; in a case in which the value of the crank counter obtained when the engine was stopped is stored, starting the engine by setting the fuel injection timings and the ignition timings of the cylinders of the engine based on the stored value of the crank counter; and resetting the crank counter when the crank counter has a value outside of a range corresponding to the tooth-missing portion in a case in which a magnitude of a difference obtained by subtracting a value of the pre-update crank counter from the value of the crank counter that was increased by receiving the pulse signal is greater than a first threshold value corresponding to the specified angle and resetting the crank counter when the crank counter has a value within the range corresponding to the tooth-missing portion in a case in which the magnitude of the difference is greater than a second threshold value that is greater than the first threshold value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller 23 according to an embodiment of a vehicle controller will now be described with reference to FIGS. 1 to 8.

Configuration of Hybrid Electric Vehicle

The configuration of a driving system of a hybrid electric vehicle controlled by the vehicle controller 23 of the present embodiment will now be described.

Figure 1:
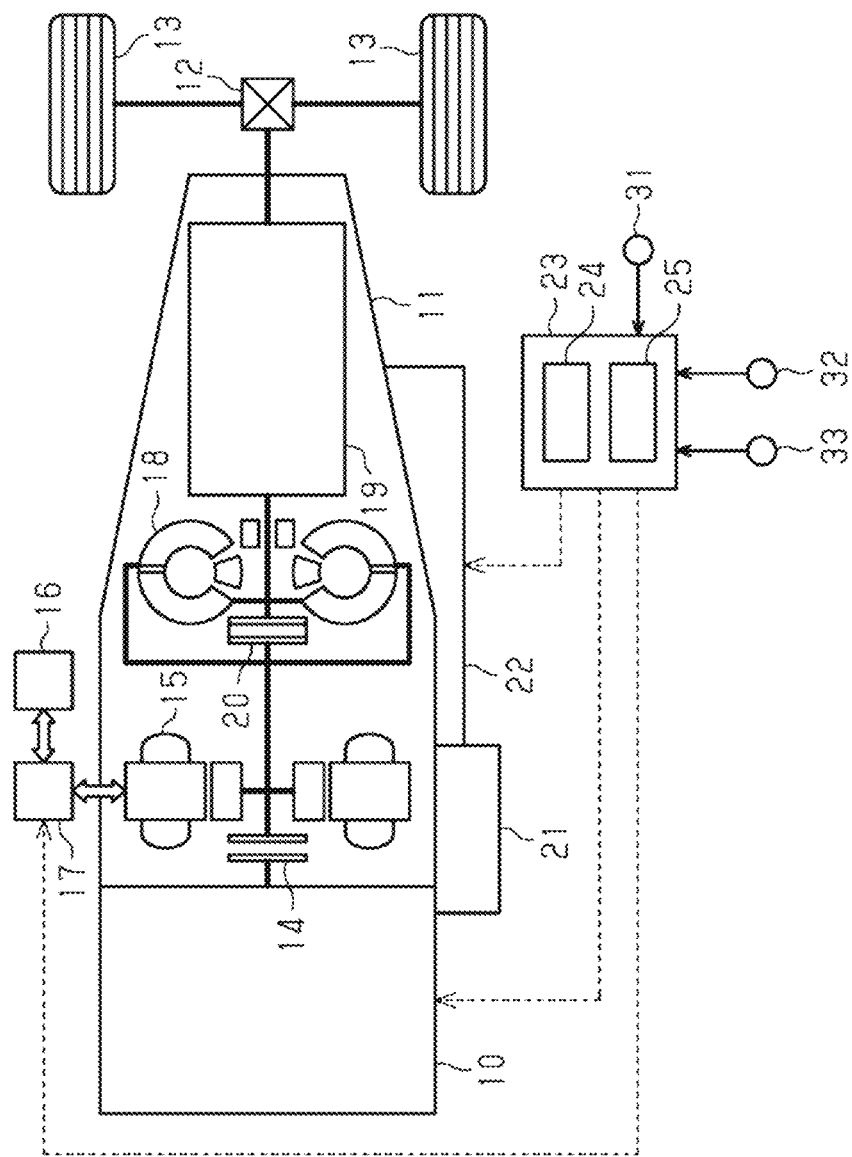
FIG. 1 is a schematic diagram showing a vehicle controller according to an embodiment and the configuration of a hybrid electric vehicle controlled by the vehicle controller.

As shown in FIG. 1, the hybrid electric vehicle includes an engine 10, which is a driving source for traveling. The engine 10 includes six cylinders. A shifting unit 11 is disposed on a power transmission path from the engine 10 to driven wheels 13 in the hybrid electric vehicle. The shifting unit 11 and the left and right driven wheels 13 are coupled to each other by a differential 12 in a drivable manner.

The shifting unit 11 includes a clutch 14 and a motor generator 15. In the shifting unit 11, the motor generator 15 is located on the power transmission path from the engine 10 to the driven wheels 13. The clutch 14 is located on a portion of the power transmission path between the engine 10 and the motor generator 15. When supplied with hydraulic pressure, the clutch 14 becomes engaged to connect the power transmission between the engine 10 and the motor generator 15. When the supply of hydraulic pressure to the clutch 14 is stopped, the clutch 14 becomes disengaged to disconnect the power transmission between the engine 10 and the motor generator 15.

The motor generator 15 is electrically connected to the battery 16 via an inverter 17. The motor generator 15 functions as a motor that generates a drive force of the hybrid electric vehicle when supplied with electric power from the battery 16. The motor generator 15 also functions as an electric power generator that generates electric power to charge the battery 16 when power is transmitted from the engine 10 or the driven wheels 13. The electric power transferred between the motor generator 15 and the battery 16 is adjusted by the inverter 17. In this manner, the hybrid electric vehicle includes the motor generator 15 and the engine 10 as the driving source.

The shifting unit 11 also includes a torque converter 18 and an automatic transmission 19. The torque converter 18 is a fluid coupling that functions to amplify torque. The automatic transmission 19 is a multi-speed automatic transmission that switches the gear ratio in multiple stages by switching gears. In the shifting unit 11, the automatic transmission 19 is located at a portion between the motor generator 15 and the driven wheels 13 on the power transmission path from the engine 10 to the driven wheels 13. The motor generator 15 and the automatic transmission 19 are coupled to each other by the torque converter 18. The torque converter 18 includes a lock-up clutch 20. When supplied with hydraulic pressure, the lock-up clutch 20 becomes engaged to directly couple the motor generator 15 to the automatic transmission 19.

The shifting unit 11 further includes an oil pump 21 and a hydraulic pressure control unit 22. The hydraulic pressure generated by the oil pump 21 is supplied to the hydraulic pressure control unit 22. The hydraulic pressure control unit 22 includes hydraulic circuits (not shown) for the clutch 14, the torque converter 18, the automatic transmission 19, and the lock-up clutch 20. These hydraulic circuits include various hydraulic pressure control valves (not shown) that are respectively used to control the hydraulic pressure in the clutch 14, the torque converter 18, the automatic transmission 19, and the lock-up clutch 20.

As shown in FIG. 1, the hybrid electric vehicle includes the vehicle controller 23. The vehicle controller 23 includes processing circuitry 24 and a memory 25. The processing circuitry 24 executes various types of computing processes related to control of the hybrid electric vehicle. The memory 25 stores programs and data used for control.

The vehicle controller 23 adjusts the transfer of electric power between the motor generator 15 and the battery 16 by controlling the inverter 17. This causes the vehicle controller 23 to control the motor generator 15. Further, the vehicle controller 23 controls the hydraulic pressure control unit 22 so as to control the clutch 14, the lock-up clutch 20, and the automatic transmission 19. Furthermore, the vehicle controller 23 controls the engine 10.

The vehicle controller 23 receives detection signals from various sensors that detect the running state of the engine 10. The various sensors include a crank position sensor 31, an accelerator pedal position sensor 32, and a vehicle speed sensor 33. The crank position sensor 31 sends a crank signal Sc corresponding to a change in the rotational phase of a crankshaft 40, which is an output shaft of the engine 10. The accelerator pedal position sensor 32 detects an operation amount of the accelerator pedal position sensor 32. The vehicle speed sensor 33 detects a vehicle speed of the hybrid electric vehicle.

The vehicle controller 23 receives the detection signals from these sensors. Based on the received detection signals, the vehicle controller 23 obtains the running state of the engine 10. For example, the vehicle controller 23 calculates an engine rotation speed Neng, which is the rotation speed of the crankshaft 40, based on the crank signal Sc received from the crank position sensor 31. Further, the vehicle controller 23 detects a crank angle, which is a rotation angle of the crankshaft 40, based on the crank signal Sc.

The vehicle controller 23 receives information related to the current, voltage and temperature of the battery 16. Based on the information related to the current, voltage and temperature of the battery 16, the vehicle controller 23 calculates a state of charge SOC, which is an index value of the state of charge of the battery 16. The state of charge SOC is the rate of the remaining charge relative to the battery charging capacity of the battery 16. Further, the vehicle controller 23 obtains the gear position and gear ratio selected by the automatic transmission 19 through the control of the hydraulic pressure control valve by the hydraulic pressure control unit 22. Furthermore, the vehicle controller 23 obtains an engagement state of the clutch 14 and an engagement state of the lock-up clutch 20. For example, the vehicle controller 23 obtains an engagement ratio as the engagement state. In the engagement ratio, a state in which the clutch 14 is located at a completely disengaged position is 0, and a state in which the clutch 14 is located at a completely engaged position is 1.

Based on the information listed above, the vehicle controller 23 controls the engine 10. Further, the vehicle controller 23 obtains and controls a rotation speed Nmg and torque TRQmg of the motor generator 15 by controlling the inverter 17. That is, the vehicle controller 23 controls the rotation speed Nmg and the torque TRQmg of the motor generator 15 and controls charge and discharge of the battery 16.

Control of Hybrid Electric Vehicle

The control of the hybrid electric vehicle performed by the vehicle controller 23 will now be described. The vehicle controller 23 calculates a requested drive force, which has a request value of the drive force of the hybrid electric vehicle, based on the accelerator pedal operation amount and the vehicle speed. The vehicle controller 23 determines torque distribution between the engine 10 and the motor generator 15 in correspondence with parameters (e.g., requested drive force and state of charge SOC). Further, the vehicle controller 23 determines the gear position of the automatic transmission 19. Furthermore, the vehicle controller 23 controls torque TRQeng of the engine 10 and the torque TRQmg of the motor generator 15. In addition, the vehicle controller 23 controls the clutch 14 and the lock-up clutch 20 and changes the gear position of the automatic transmission 19.

The vehicle controller 23 may charge the battery 16 with electric power generated by causing the motor generator 15 to function as an electric power generator. In the hybrid electric vehicle, the resistance of the motor generator 15 produced by generating electric power may be used as braking. The braking by the resistance of the motor generator 15 resulting from the generation of electric power is referred to as regenerative braking. The vehicle controller 23 controls the regenerative braking by controlling the inverter 17.

Electric Traveling and Hybrid Traveling

The hybrid electric vehicle can perform hybrid traveling, in which the driven wheels 13 are driven using the engine 10 and the motor generator 15.

In hybrid traveling, the vehicle controller 23 engages the clutch 14 so that drive transmission between the motor generator 15 and the engine 10 is connected by the clutch 14. In this state, for example, the vehicle controller 23 uses the motor generator 15 to generate electric power while using the drive force of the engine 10 to cause the hybrid electric vehicle to travel. Further, in hybrid traveling, the vehicle controller 23 determines the torque distribution between the engine 10 and the motor generator 15 such that the requested drive force is achieved as described above. Based on the determined torque distribution, the vehicle controller 23 controls the torque TRQeng of the engine 10 and the torque TRQmg of the motor generator 15. In hybrid traveling, the vehicle controller 23 thus uses the drive force of the engine 10 and the drive force of the motor generator 15 to cause the hybrid electric vehicle to travel.

The hybrid electric vehicle can perform electric traveling by driving the motor generator 15 using the electric power stored in the battery 16. In electric traveling, only the motor generator 15 is used to drive the driven wheels 13.

Specifically, in electric traveling, the vehicle controller 23 stops the running of the engine 10 and disengages the clutch 14 so that the drive transmission between the motor generator 15 and the engine 10 is disconnected. In this state, the vehicle controller 23 uses the drive force of the motor generator 15 to cause the hybrid electric vehicle to travel.

During electric traveling, the hybrid electric vehicle performs braking through regenerative braking, which is caused by generating electric power in the motor generator 15.

Control of Engine 10

The vehicle controller 23 performs various types of controls on, for example, fuel injection of the engine 10 and cranking when the engine 10 is started.

Specifically, the vehicle controller 23 executes cylinder identification based on the crank signal Sc, which is sent from the crank position sensor 31, and sets fuel injection timings and ignition timings of the cylinders of the engine 10 based on the crank angle.

When a predetermined stop condition is satisfied, the vehicle controller 23 automatically stops the engine 10. When a predetermined restart condition is satisfied, the vehicle controller 23 executes an automatic stop restart control that automatically starts the engine 10.

In the automatic stop restart control, when the predetermined stop condition is satisfied (e.g., when the brake is depressed and the hybrid electric vehicle remains in a stopped state for a predetermined period), the vehicle controller 23 stops injecting fuel and causes the engine 10 to stop automatically. Further, when the predetermined restart condition is satisfied (e.g., which the brake is released) during automatic stop of the engine 10, the vehicle controller 23 restarts the engine 10.

The vehicle controller 23 stores the crank angle obtained when the engine 10 stops automatically. Based on the crank angle, the vehicle controller 23 executes fuel injection when the engine 10 is restarted. This shortens the start time when the engine 10 is restarted.

When the engine 10 is in a stopped state, the crankshaft 40 completely stops after repeatedly rotating forward and backward. Thus, the crank position sensor 31 is capable of detecting rotation of the crankshaft 40 in both of the forward and backward direction.

Crank Position Sensor 31

The crank position sensor 31 and its surrounding configuration will now be described with reference to FIG. 2.

Figure 2:
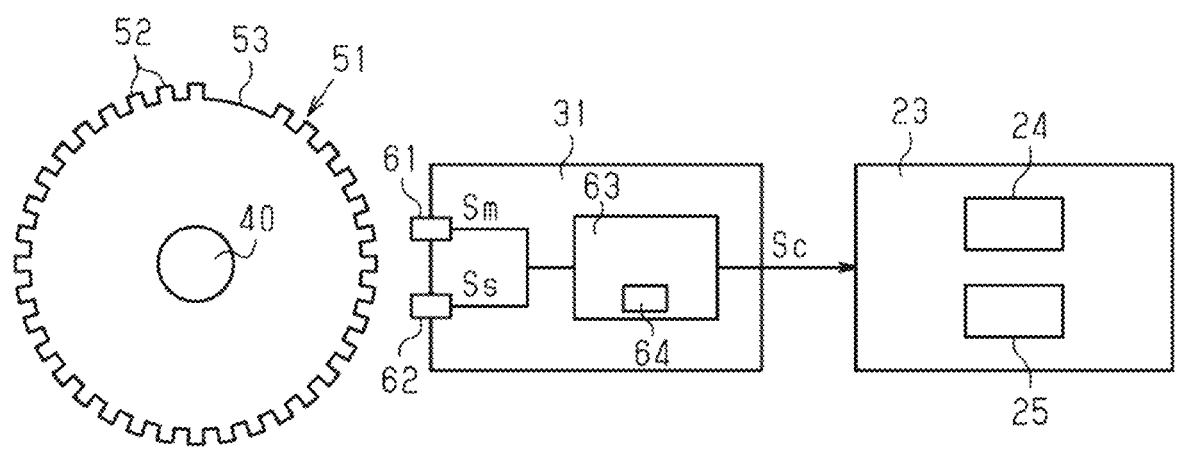
FIG. 2 is a schematic diagram showing the crank position sensor and its surrounding configuration.

As shown in FIG. 2, a disk-shaped signal rotor 51 is coupled to the crankshaft 40. On the outer edge of the signal rotor 51, teeth 52 are each arranged at a specified angle. Specifically, thirty-four teeth 52 are each arranged at an interval of 10°. The signal rotor 51 includes a tooth-missing portion 53 where two teeth 52 are missing on a part of the outer edge. That is, the tooth-missing portion 53 is located between adjacent ones of the teeth 52 in the circumferential direction of the signal rotor 51. The interval between the two teeth 52 on opposite sides of the tooth-missing portion 53 is longer than the intervals of the other portions. The phase difference of the two teeth 52 on the opposite sides of the tooth-missing portion 53 is 30°.

As shown in FIG. 2, the crank position sensor 31 is located at a position facing the outer edge of the signal rotor 51. The crank position sensor 31 detects the crank angle, which is the rotation angle of the crankshaft 40, and the engine rotation speed Neng.

The crank position sensor 31 includes a main sensor 61 and a sub-sensor 62. The sub-sensor 62 is spaced apart from the main sensor 61 at a predetermined interval in the rotation direction of the signal rotor 51. The main sensor 61 and the sub-sensor 62 are both located at positions facing the teeth 52. The main sensor 61 and the sub-sensor 62 are both used to send a pulse signal each time one tooth 52 of the signal rotor 51 passes by the vicinity of the sensor as the crankshaft 40 rotates. The main sensor 61 and the sub-sensor 62 are each located such that the phase of a signal sent from the main sensor 61 is shifted from the phase of a signal sent from the sub-sensor 62.

The crank position sensor 31 includes a processing device 63. The processing device 63 sends a pulse signal corresponding to a pulse main signal Sm, which is sent from the main sensor 61, and a pulse sub-signal Ss, which is sent from the sub-sensor 62. The pulse signal that is sent from the processing device 63 is the crank signal Sc. The vehicle controller 23 receives the crank signal Sc that has been sent from the processing device 63.

The processing device 63 includes a timer 64 that controls the pulse width of the crank signal Sc. Each time the crankshaft 40 rotates at a specified angle, the crank position sensor 31 sends the crank signal Sc with a pulse width that differs depending on the rotation direction.

The crank signal Sc is generated as follows.

Figure 3:
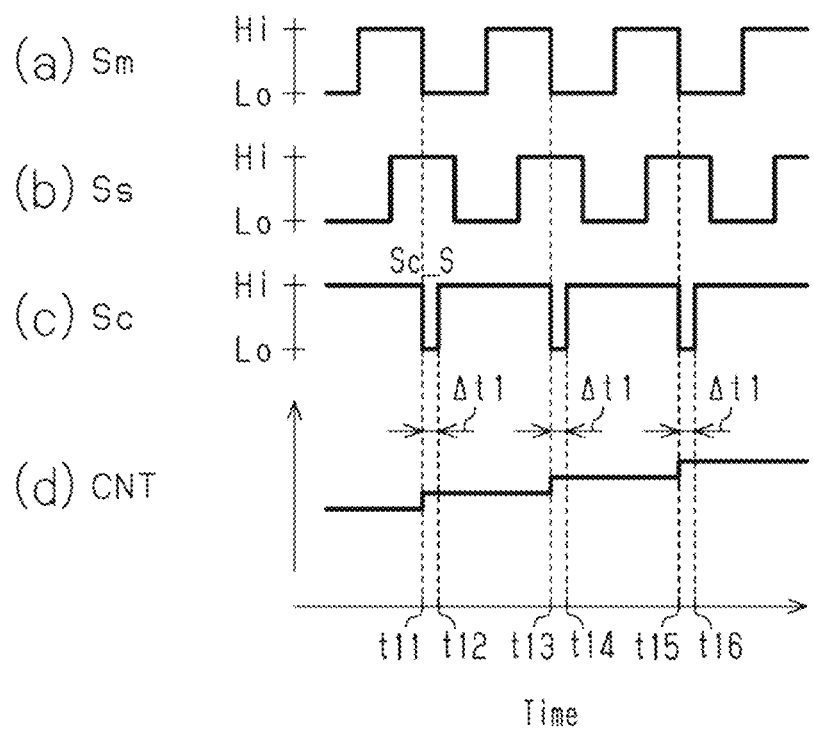
FIG. 3 is a timing diagram illustrating changes in the crank counter that occur when the crankshaft is rotating forward, in which section (a) shows changes in the main signal, section (b) shows changes in the sub-signal, section (c) shows changes in the crank signal, and section (d) shows changes in the crank counter.

Sections (a), (b), and (c) of FIG. 3 respectively show changes in the main signal Sm, changes in the sub-signal Ss, and changes in the crank signal Sc that occur when the crankshaft 40 is rotating forward.

In a case in which the crankshaft 40 is rotating forward, during a change in the main signal Sm from a Hi level to a Lo level (hereinafter referred to as fall) as shown in section (a) of FIG. 3, the sub-signal Ss is at the Hi level as shown in section (b) of FIG. 3. That is, when the main signal Sm changes from the Hi level to the Lo level while the sub-signal Ss is at the Hi level, it indicates that the crankshaft 40 is rotating forward. In this case, as shown in section (c) of FIG. 3, the processing device 63 sends a first signal Sc_S. The first signal Sc_S is the crank signal Sc having a pulse width of $\Delta t1$.

Figure 4:
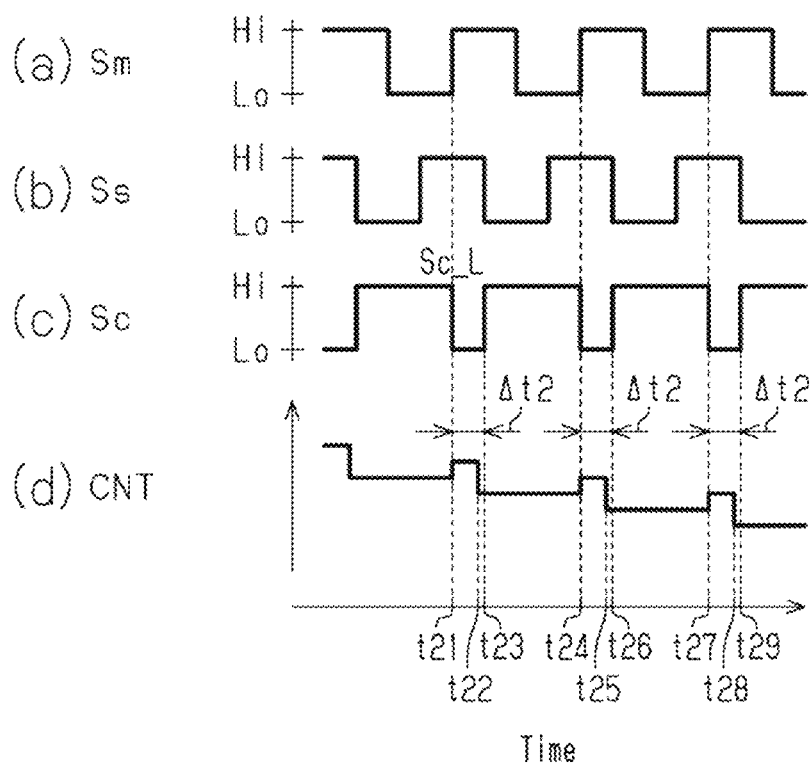
FIG. 4 is a timing diagram illustrating changes in the crank counter that occur when the crankshaft is rotating backward, in which section (a) shows changes in the main signal, section (b) shows changes in the sub-signal, section (c) shows changes in the crank signal, and section (d) shows changes in the crank counter.

Sections (a), (b), and (c) of FIG. 4 respectively show changes in the main signal Sm, changes in the sub-signal Ss, and changes in the crank signal Sc that occur when the crankshaft 40 is rotating backward.

In a case in which the crankshaft 40 is rotating backward, during a change in the main signal Sm from the Lo level to the Hi level (hereinafter referred to as rise) as shown in section (a) of FIG. 4, the sub-signal Ss is at the Hi level as shown in section (b) of FIG. 4. That is, when the main signal Sm changes from the Lo level to the Hi level while the sub-signal Ss is at the Hi level, it indicates that the crankshaft 40 is rotating backward. In this case, as shown in section (c) of FIG. 4, the processing device 63 sends a second signal Sc_L. The second signal Sc_L is the crank signal Sc having a pulse width of $\Delta t2$. Here, $\Delta t2$ is longer than $\Delta t1$.

Thus, the crank position sensor 31 detects the rotation of the crankshaft 40 by the specified angle when a condition in which the sub-signal Ss is at the Hi level and the main signal Sm has changed is satisfied. The processing device 63 detects the rotation direction of the crankshaft 40 based on the direction of the change in the main signal Sm at a time when the condition is satisfied. That is, the processing device 63 detects the rotation direction of the crankshaft 40 depending on whether the rise or fall has occurred.

Crank Counter CNT

The vehicle controller 23 counts the number of times the crank signal Sc has been received and calculates a crank counter CNT to detect the crank angle. The crank counter CNT has a value corresponding to the crank angle.

As shown in section (d) of FIG. 3 and section (d) of FIG. 4, the vehicle controller 23 increases and updates the crank counter CNT each time the crank signal Sc changes from the Hi level to the Lo level. When determining that the crankshaft 40 is rotating backward based on the pulse width of the crank signal Sc, the vehicle controller 23 corrects the crank counter CNT so that the crank counter CNT becomes lower than a pre-update crank counter CNT as shown in section (d) of FIG. 3. The vehicle controller 23 updates the crank counter CNT by executing such a counter updating process.

The value of the crank counter CNT corresponds to the crank angle. As the value of the crank counter CNT becomes larger, it indicates that the crank angle becomes larger. When the crank counter CNT becomes a value corresponding to 720° CA (i.e., 0° CA), the crank counter CNT is reset to 0 again.

Based on one cycle (i.e., time interval) of the crank signal Sc, the vehicle controller 23 performs a missing tooth passage determination that determines whether the tooth-missing portion 53 has passed. When determining through the missing tooth passage determination that the tooth-missing portion 53 has passed, the vehicle controller 23 regards the crank angle as a reference angle (210° CA, 570° CA) and starts calculating the crank counter CNT from that point. The vehicle controller 23 identifies whether the crank angle is 210° CA or 570° CA based on a combination with a cam angle signal.

The counter updating process executed by the vehicle controller 23 will now be described with reference to the flowchart of FIG. 5. Each time the vehicle controller 23 receives the crank signal Sc after the missing tooth passage determination is completed, the vehicle controller 23 executes a routine of the counter updating process shown in FIG. 5.

Figure 5:
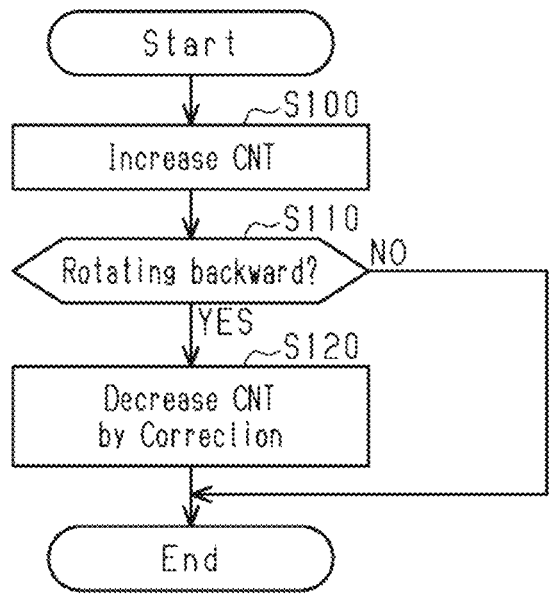
FIG. 5 is a flowchart illustrating the flow of processes in a routine of the counter updating process.

As shown in FIG. 5, when starting the routine, the vehicle controller 23 increases the crank counter CNT to update the crank counter CNT in the process of step S100. In the process of the next step S110, the vehicle controller 23 determines whether the crankshaft 40 is rotating backward. Specifically, the vehicle controller 23 determines that the crankshaft 40 is rotating backward when the pulse width of the crank signal Sc sent from the crank position sensor 31 is longer than $\Delta t1$. The vehicle controller 23 determines that the crankshaft 40 is rotating forward when the pulse width of the crank signal Sc sent from the crank position sensor 31 is less than or equal to AU.

When determining that the crankshaft 40 is rotating forward in the process of step S110 (step S110: NO), the vehicle controller 23 temporarily ends the routine. That is, when the crankshaft 40 is rotating forward, the vehicle controller 23 increases the crank counter CNT.

When determining that the crankshaft 40 is rotating backward in the process of step S110 (step S110: YES), the vehicle controller 23 advances the process to step S120. The vehicle controller 23 corrects the crank counter CNT so that the crank counter CNT becomes lower than the crank counter CNT prior to being updated in step S100. Then, the vehicle controller 23 temporarily ends the routine.

When the crank position sensor 31 detects the teeth 52 arranged at equal intervals other than the two teeth 52 on the opposites of the tooth-missing portion 53, the vehicle controller 23 adds 10 to the crank counter CNT in the process of step S100. In the process of step S120, the vehicle controller 23 corrects the crank counter CNT so as to subtract 20 from the crank counter CNT. Thus, when the crankshaft 40 is rotating forward, the vehicle controller 23 sets the crank counter CNT to be larger than the pre-update crank counter CNT by 10. When the crankshaft 40 is rotating backward, the vehicle controller 23 sets the crank counter CNT to be smaller than the pre-update crank counter CNT by 10.

When the crank position sensor 31 detects the two teeth 52 on the opposites of the tooth-missing portion 53, the amount of increasing the crank counter CNT is different from the amount of decreasing the crank counter CNT.

For example, when the crank counter CNT is 180 or 540, the vehicle controller 23 adds 30 to the crank counter CNT in the process of step S100. In the process of step S120, the vehicle controller 23 corrects the crank counter CNT so as to subtract 40 from the crank counter CNT. Thus, when the crankshaft 40 is rotating forward, the vehicle controller 23 sets the crank counter CNT to be larger than the pre-update crank counter CNT by 30, which corresponds to an amount of extension beyond the tooth-missing portion 53. When the crankshaft 40 is rotating backward, the vehicle controller 23 sets the crank counter CNT to be smaller than the pre-update crank counter CNT by 10.

In addition, when the crank counter CNT is 210 or 570, the vehicle controller 23 adds 10 to the crank counter CNT in the process of step S100. In the process of step S120, the vehicle controller 23 corrects the crank counter CNT so as to subtract 40 from the crank counter CNT. Thus, when the crankshaft 40 is rotating forward, the vehicle controller 23 sets the crank counter CNT to be larger than the pre-update crank counter CNT by 10. When the crankshaft 40 is rotating backward, the vehicle controller 23 sets the crank counter CNT to be smaller than the crank counter CNT by 30, which corresponds to an amount of extension beyond the tooth-missing portion 53.

As shown in sections (a) to (d) of FIG. 3, when the crankshaft 40 is rotating forward, the counter updating process causes the crank counter CNT to increase by 10 each time the crank signal Sc is received. Specifically, as shown in section (c) of FIG. 3, the counter updating process is started when a fall of the crank signal Sc is detected at time t11. Thus, as shown in section (d) of FIG. 3, the crank counter CNT is increased by 10 through the process of step S100.

Based on the fact that the pulse width is $\Delta t1$ at time t12, the crank signal Sc is identified as being the first signal Sc_S. As a result, it is determined that the crankshaft 40 is rotating forward (step S110: NO). Accordingly, the counter updating process is temporarily ended.

Similarly, as shown in section (c) of FIG. 3, when a fall of the crank signal Sc is detected at time t13, the counter updating process is started again. Thus, as shown in section (d) of FIG. 3, the crank counter CNT is increased by 10 through the process of step S100. At time t14, the pulse width is identified as being $\Delta t1$. Then, it is determined that the crankshaft 40 is rotating forward (step S110: NO). Further, when a fall of the crank signal Sc is detected at time t15, the counter updating process is started again. Thus, as shown in section (d) of FIG. 3, the crank counter CNT is increased by 10 through the process of step S100.

At time t16, the pulse width is identified as being $\Delta t1$. Then, it is determined that the crankshaft 40 is rotating forward (step S110: NO). When the crankshaft 40 is rotating forward in this manner, the crank counter CNT is increased by 10 each time the crank signal Sc is received.

In the same manner, as shown in sections (a) to (d) of FIG. 4, when the crankshaft 40 is rotating backward, the crank counter CNT is increased by 10 each time the crank signal Sc is received. However, when it is determined that the crankshaft 40 is rotating backward, the crank counter CNT is decreased by 20. Thus, the crank counter CNT becomes smaller than the pre-update crank counter CNT by 10 through the counter updating process. Specifically, as shown in section (c) of FIG. 4, the counter updating process is started when a fall of the crank signal Sc is detected at time t21. Thus, as shown in section (d) of FIG. 4, the crank counter CNT is increased by 10 through the process of step S100.

Based on the fact that the pulse width is longer than $\Delta t1$ at time t22, the crank signal Sc is identified as being the second signal Sc_L. As a result, it is determined that the crankshaft 40 is rotating backward (step S110: YES). Then, as shown in section (d) of FIG. 4, the crank counter CNT is decreased by 20 through the process of step S120. Accordingly, the counter updating process is temporarily ended. Hence, when the rise of the second signal Sc_L is detected at time t23, the crank counter CNT is smaller than the pre-update crank counter CNT by 10.

Likewise, as shown in section (c) of FIG. 4, when a fall of the crank signal Sc is detected at time t24, the counter updating process is started again. Thus, as shown in section (d) of FIG. 4, the crank counter CNT is increased by 10 through the process of step S100. At time t25, the pulse width is identified as being longer than $\Delta t1$. As a result, it is determined that the crankshaft 40 is rotating backward (step S110: YES). Then, as shown in section (d) of FIG. 4, the crank counter CNT is decreased by 20 through the process of step S120. Thus, at time t26, the crank counter CNT is smaller than the pre-update crank counter CNT by 10.

Further, when a fall of the crank signal Sc is detected at time t27, the counter updating process is started again. Thus, as shown in section (d) of FIG. 4, the crank counter CNT is increased by 10 through the process of step S100. At time t28, the pulse width is identified as being longer than $\Delta t1$. As a result, it is determined that the crankshaft 40 is rotating backward (step S110: YES). Then, as shown in section (d) of FIG. 4, the crank counter CNT is decreased by 20 through the process of step S120. Thus, at time t29, the crank counter CNT is smaller than the pre-update crank counter CNT by 10. When the crankshaft 40 is rotating backward in this manner, the crank counter CNT is decreased by 10 each time the crank signal Sc is received and the counter updating process is executed.

The crank counter CNT detected by the vehicle controller 23 may potentially be shifted from an actual crank angle. In a case in which such a shift occurs, the fuel injection timing and the ignition timings set by the vehicle controller 23 based on the crank counter CNT may potentially be improper.

Starting Process

For example, the vehicle controller 23 stores, in the memory 25, the crank counter CNT obtained when the engine 10 was stopped. Based on the stored crank counter CNT, the vehicle controller 23 sets the fuel injection timings and ignition timings of the cylinders when automatically starting the engine 10. This allows the starting of the engine 10 to be completed quickly.

There may be a case in which the memory 25 does not store the crank counter CNT. Thus, when starting the engine 10, the vehicle controller 23 executes a routine shown in FIG. 6. In this routine, the vehicle controller 23 selects the starting process depending on whether the crank counter CNT is stored.

Figure 6:
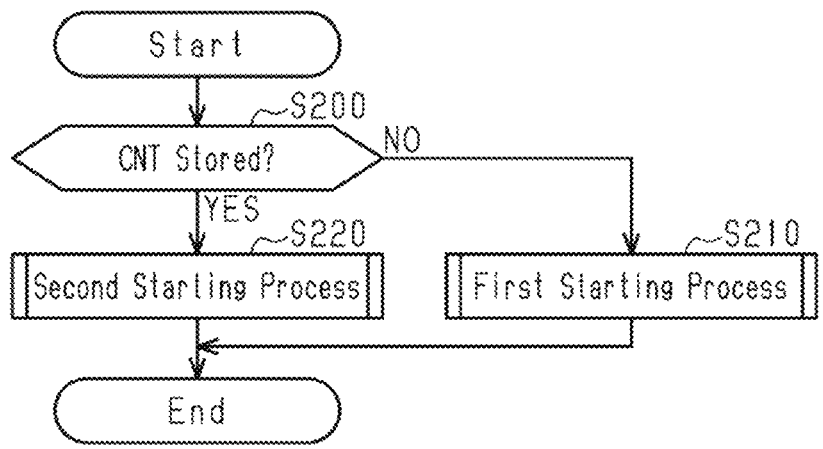
FIG. 6 is a flowchart illustrating the flow of processes in a routine that selects the starting process.

As shown in FIG. 6, when starting the routine, the vehicle controller 23 determines in the process of step S200 whether the crank counter CNT is stored by checking whether the crank counter CNT is stored in the memory 25.

When determining in the process of step S200 that the crank counter CNT is not stored (step S200: NO), the vehicle controller 23 advances the process to step S210.

In the process of step S210, the vehicle controller 23 selects a first starting process and executes the first starting process. In the first starting process, after the crank angle is identified during cranking so that the crank counter CNT is allowed to be updated, the engine 10 is started by setting the fuel injection timings and the ignition timings of the cylinders of the engine 10. In the hybrid electric vehicle, cranking is performed by engaging the clutch 14 and driving the crankshaft 40 using the motor generator 15.

When determining in the process of step S200 that the crank counter CNT is stored (step S200: YES), the vehicle controller 23 advances the process to step S220.

In the process of step S220, the vehicle controller 23 selects a second starting process and executes the second starting process. In the second starting process, as described above, the engine 10 is started by setting the fuel injection timings and the ignition timings of the cylinders of the engine 10 based on the value of the stored crank counter CNT.

Thus, even when the value of the crank counter CNT is not stored, the engine 10 can be started by selecting the starting process through the process of selection.

The value of the crank counter CNT detected by the vehicle controller 23 may potentially be shifted from an actual crank angle. In this case, the fuel injection timings and the ignition timings set by the vehicle controller 23 based on the crank counter CNT stored will be unsuitable for starting the engine 10. As a result, the engine 10 may fail to be started.

Resetting Process

To solve this problem, the vehicle controller 23 executes a resetting process that resets the crank counter CNT by determining that a shift has occurred in the crank counter CNT. Specifically, the vehicle controller 23 calculates the difference obtained by subtracting the value of the pre-update crank counter CNT from the value of the crank counter CNT increased through the counter updating process when receiving the crank signal Sc. In a case in which the magnitude of the difference is greater than a determination threshold value Xcnt, the vehicle controller 23 resets the crank counter CNT.

As described above, the crank counter CNT is increased by 10 each time the crank position sensor 31 detects a tooth 52. Thus, when the determination threshold value Xcnt is set to 10, the vehicle controller 23 can detect the variation in the crank counter CNT by a value greater than 10 in the counter updating process, thereby determining that a shift has occurred in the crank counter CNT.

However, when the engine 10 is in a stopped state, there is a possibility that the vehicle is swayed back so as to change the rotation direction of the crankshaft 40 and cause the crankshaft 40 to rotate backward as described above.

Figure 7:
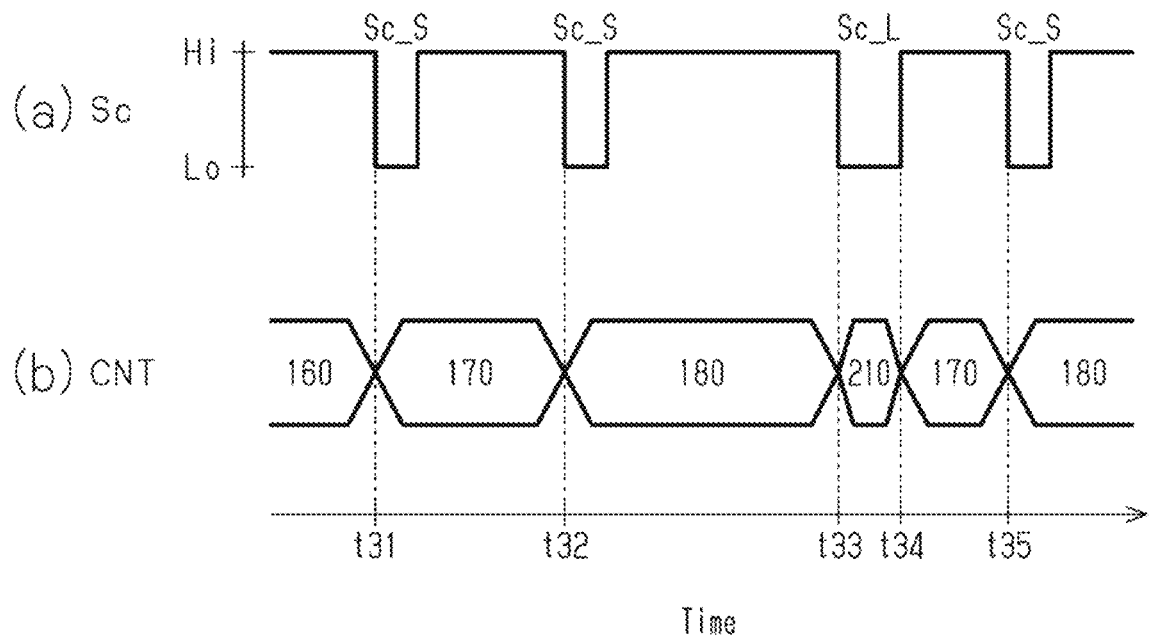
FIG. 7 is a timing diagram illustrating the relationship between the crank signal and the crank counter obtained when the rotation direction of the crankshaft is reversed, in which section (a) shows changes in the crank signal and section (b) shows changes in the crank counter.

FIG. 7 illustrates changes in the crank counter CNT that occur in a case in which such backward rotation occurs. As shown in section (a) of FIG. 7, a fall of the first signal Sc_S is detected at time t31. Then, as shown in section (b) of FIG. 7, the vehicle controller 23 increases the crank counter CNT by 10. This causes the crank counter CNT to become 170. Since the received crank signal Sc is the first signal Sc_S, the counter updating process is ended without making correction to decrease the crank counter CNT. Thus, the crank counter CNT is kept at 170.

In the same manner, as shown in section (a) of FIG. 7, a fall of the first signal Sc_S is detected at time t32. Then, as shown in section (b) of FIG. 7, the crank counter CNT is increased by 10. This causes the crank counter CNT to become 180. When the crank counter CNT is 180, it indicates that the crank angle has reached the tooth-missing portion 53.

As the rotation direction of the crankshaft 40 reverses, the crankshaft 40 rotates backward. Then, as shown in section (a) of FIG. 7, a fall of the second signal Sc_L is detected at time t33. At this time, the crank counter CNT is 180. Thus, as described above, 30 is added to the crank counter CNT. Then, as shown in section (b) of FIG. 7, the crank counter CNT becomes 210. When determining that the crankshaft 40 is rotating backward from the fact that the pulse width is longer than Δt1 at time t34, the vehicle controller 23 makes correction to subtract 40 from the crank counter CNT. This changes the crank counter CNT to 170, which is smaller than the pre-update value at time t33 (i.e., 180).

When the rotation direction of the crankshaft 40 is reversed, a fall of the first signal Sc_S is detected again at time t35 as shown in section (a) of FIG. 7. Then, as shown in section (b) of FIG. 7, the crank counter CNT is increased by 10. This causes the crank counter CNT to become 180.

In this manner, when the rotation direction of the crankshaft 40 is reversed at a crank angle that corresponds to the tooth-missing portion 53, the crank counter CNT is varied by a value greater than 10 in the counter updating process. Then, the counter updating process is performed to correct the crank counter CNT so that the crank counter CNT has a correct value. However, in the above case of detecting the variation in the crank counter CNT by a value greater than 10 so as to determine that a shift has occurred in the crank counter CNT, it is determined that the shift has occurred at the point in time when the variation by a value greater than 10 occurs. As a result, the crank counter CNT will be reset. That is, in the example of FIG. 7, the crank counter CNT will be reset at time t33 although the crank counter CNT has been correctly updated.

In a case in which the crank counter CNT is reset although the crank counter CNT has been correctly updated, the starting of the engine 10 cannot be quickly completed using the second starting process.

To solve this problem, the vehicle controller 23 of the present embodiment changes the determination threshold value Xcnt to be greater when the crank counter CNT has a value within a range that corresponds to the tooth-missing portion 53. This prevents the crank counter CNT from being reset although the crank counter CNT has been correctly updated.

Figure 8:
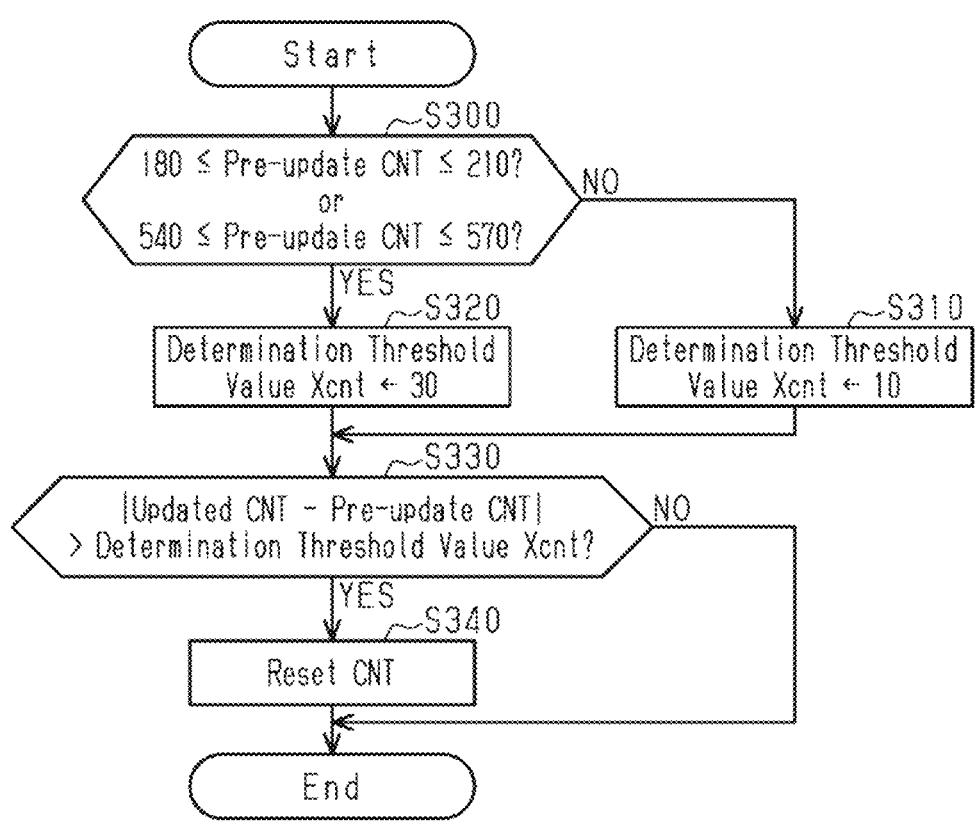
FIG. 8 is a flowchart illustrating the flow of processes in a routine of the resetting process.

The flow of the resetting process executed by the vehicle controller 23 of the present embodiment will now be described with reference to FIG. 8. The routine illustrated in FIG. 8 is executed by the vehicle controller 23 each time the counter updating process ends.

When starting the routine, the vehicle controller 23 first executes the process of step S300. In the process of step S300, the vehicle controller 23 determines whether the crank counter CNT has a value within the range that corresponds to the tooth-missing portion 53. When the following condition (A) or (B) is satisfied, the vehicle controller 23 determines that the crank counter CNT has a value within the range that corresponds to the tooth-missing portion 53.

Condition (A): The pre-update crank counter CNT is greater than or equal to 180 and less than or equal to 210.

Condition (B): The pre-update crank counter CNT is greater than or equal to 540 and less than or equal to 570.

The pre-update crank counter CNT refers to the value of the crank counter CNT prior to being updated through the process of step S100 in the counter updating process, which is performed immediately before the execution of the resetting process. When neither the condition (A) nor (B) is satisfied, the vehicle controller 23 determines that the crank counter CNT has a value outside of the range that corresponds to the tooth-missing portion 53.

When determining in the process of step S300 that the crank counter CNT has a value outside of the range that corresponds to the tooth-missing portion 53 (step S300: NO), the vehicle controller 23 advances the process to step S310. In the process of step S310, the vehicle controller 23 sets the magnitude of the determination threshold value Xcnt to 10 (a first threshold value).

When determining in the process of step S300 that the crank counter CNT has a value within the range that corresponds to the tooth-missing portion 53 (step S300: YES), the vehicle controller 23 advances the process to step S320. In the process of step S320, the vehicle controller 23 sets the magnitude of the determination threshold value Xcnt to 30 (a second threshold value).

When setting the magnitude of the determination threshold value Xcnt in the process of step S310 or step S320, the vehicle controller 23 advances the process to step S330. In the process of step S330, the vehicle controller 23 determines whether the magnitude of the difference obtained by subtracting the value of the pre-update crank counter CNT from the value of the updated crank counter CNT is greater than the determination threshold value Xcnt. The updated crank counter CNT refers to the value of the crank counter CNT that has been updated through the process of step S100 in the counter updating process, which is performed immediately before the execution of the resetting process.

Specifically, in the process of step S320, the vehicle controller 23 calculates the difference obtained by subtracting the pre-update crank counter CNT from the updated crank counter CNT. Then, the vehicle controller 23 compares the absolute value of the calculated difference with the determination threshold value Xcnt.

When the absolute value is greater than determination threshold value Xcnt, the vehicle controller 23 determines that the magnitude of the difference obtained by subtracting the value of the pre-update crank counter CNT from the value of the updated crank counter CNT is greater than the determination threshold value Xcnt.

When determining that the magnitude of the difference obtained by subtracting the value of the pre-update crank counter CNT from the value of the updated crank counter CNT is greater than the determination threshold value Xcnt (step S330: YES), the vehicle controller 23 advances the process to step S340.

In the process of step S340, the vehicle controller 23 resets the crank counter CNT. Resetting the crank counter CNT in this manner causes the memory 25 to store no crank counter CNT.

When determining that the magnitude of the difference obtained by subtracting the value of the pre-update crank counter CNT from the value of the updated crank counter CNT is less than or equal to the determination threshold value Xcnt (step S330: NO), the vehicle controller 23 ends the routine. That is, the vehicle controller 23 temporarily ends the routine without executing the process of step S340 (i.e., without resetting the crank counter CNT).

Operation of Present Embodiment

As described above, the vehicle controller 23 changes the magnitude of the determination threshold value Xcnt depending on whether the crank counter CNT has a value within the range that corresponds to the tooth-missing portion 53. When the crank counter CNT has a value outside of the range that corresponds to the tooth-missing portion 53, the vehicle controller 23 sets the determination threshold value Xcnt to 10, which corresponds to the specified angle. Then, the vehicle controller 23 calculates the difference obtained by subtracting the pre-update crank counter CNT from the updated crank counter CNT that has been increased by receiving the crank signal Sc in the counter updating process. When the magnitude of the calculated difference is greater than 10, the vehicle controller 23 resets the crank counter CNT.

When the crank counter CNT has a value within the range that corresponds to the tooth-missing portion 53, the vehicle controller 23 sets the determination threshold value Xcnt to 30. Then, the vehicle controller 23 calculates the difference obtained by subtracting the pre-update crank counter CNT from the updated crank counter CNT that has been increased by receiving the crank signal Sc in the counter updating process. When the magnitude of the calculated difference is greater than 30, the vehicle controller 23 resets the crank counter CNT.

In this manner, the vehicle controller 23 compares the increase amount of the crank counter CNT with the determination threshold value Xcnt when the crank counter CNT is increased based on the fact that the crank signal Sc has been received. When the increase amount is greater than the determination threshold value Xcnt, the vehicle controller 23 resets the crank counter CNT. This allows the vehicle controller 23 to determine that the crank counter CNT has a value shifted from an actual crank angle. Then, the vehicle controller 23 resets the incorrect crank counter CNT.

Advantages of Present Embodiment (1) The vehicle controller 23 prevents the engine 10 from being started in a state in which the fuel injection amount and the ignition timing of each cylinder is set based on an incorrect crank counter CNT. Thus, the vehicle controller 23 prevents the engine 10 from failing to be started.

(2) When the crank counter CNT has a value within the range that corresponds to the tooth-missing portion 53, the vehicle controller 23 sets the determination threshold value Xcnt to 30, which is greater than 10. When the increase amount of the crank counter CNT is greater than the determination threshold value Xcnt, the vehicle controller 23 resets the crank counter CNT. Thus, the vehicle controller 23 prevents the crank counter CNT from being reset although the crank counter CNT is not shifted from an actual crank angle. Accordingly, the vehicle controller 23 prevents the engine 10 from failing to be started while allowing for the execution of the second starting process using the value of the stored crank counter CNT.

(3) When the crank counter CNT has a value within the range that corresponds to the tooth-missing portion 53, the magnitude of the determination threshold value Xcnt set by the vehicle controller 23 is 30. This value corresponds to a crank angle obtained from when one of the two teeth 52 on the opposite sides of the tooth-missing portion 53 is detected by the crank position sensor 31 to when the other one of the two teeth 52 is detected by the crank position sensor 31.

In a case in which the determination threshold value Xcnt is excessively large, the second starting process is executed without resetting the crank counter CNT even if the value of the updated crank counter CNT is shifted from an actual crank angle. As described above, the vehicle controller 23 sets the determination threshold value Xcnt to 30 and thus allows the second starting process to be executed only when the crank counter CNT is updated properly. That is, the vehicle controller 23 properly prevents the engine 10 from failing to be started.

The present embodiment may be modified as follows. The present embodiment and the following modifications can be combined as long as they remain technically consistent with each other.

In the above embodiment, when the crank counter CNT has a value within the range that corresponds to the tooth-missing portion 53, the vehicle controller 23 sets the determination threshold value Xcnt to 10 as the first threshold value. Further, when the crank counter CNT has a value within the range that corresponds to the tooth-missing portion 53, the vehicle controller 23 sets the determination threshold value Xcnt to 30 as the second threshold value. Instead, the second threshold value may be greater than 30.

Even when the second threshold value is set to be greater than 30, the crank counter CNT is prevented from being erroneously reset.

In the above embodiment, the hybrid electric vehicle does not include a starter motor. Instead, the vehicle controller 23 of the above embodiment may be employed in a vehicle that includes a starter motor. That is, the vehicle controller 23 may be employed in a vehicle that performs cranking using a starter motor.

In the above embodiment, the vehicle controller 23 is employed in the hybrid electric vehicle with a single electric motor in which the transmission of power between the engine 10 and the motor generator 15 is disconnected by the clutch 14. Instead, the vehicle controller 23 may be employed in any vehicle that is equipped with the engine 10.

In the above embodiment, the vehicle is equipped with the engine 10 including six cylinders. Instead, the vehicle controller 23 may be employed in, for example, a four-cylinder engine or a three-cylinder engine.

The number of the teeth 52 of the signal rotor 51, the interval between adjacent ones of the teeth 52, the interval between the teeth 52 in the tooth-missing portion 53, and the like in the above embodiment are not limited to the examples of the above embodiment. The amount of increasing the crank counter CNT and the amount of decreasing the crank counter CNT through correction in the counter updating process only need to be set in correspondence with the number of the teeth 52, the interval between adjacent ones of the teeth 52, and the interval between the teeth 52 in the tooth-missing portion 53. Also, the magnitudes of the first threshold value and the second threshold value only need to be set in correspondence with the number of the teeth 52, the interval between adjacent ones of the teeth 52, and the interval between the teeth 52 in the tooth-missing portion 53.

In the above embodiment, the hybrid electric vehicle does not include a starter motor and cranks the engine 10 using the motor generator 15. Instead, the same vehicle controller as that of the above embodiment may be employed in a hybrid electric vehicle that includes a starter motor and cranks using a drive force of the starter motor.

The vehicle controller 23 is not limited to a device that includes the processing circuitry 24 and the memory 25 and executes software processing. For example, the vehicle controller 23 may include hardware circuits (e.g., ASICs) that execute, using hardware, at least part of the processes executed using software in the above embodiment. That is, the vehicle controller 23 may be modified as long as it has any one of the following configurations (a) to (c): (a) a configuration including processing circuitry that executes all of the above processes according to programs and a program storage device such as a ROM that stores the programs; (b) a configuration including processing circuitry and a program storage device that execute a part of the above-described processes according to the programs and a dedicated hardware circuit that executes the remaining processes; and (c) a configuration including a dedicated hardware circuit that executes all of the above-described processes. There may be multiple software execution devices each including processing circuitry and a program storage device, and there may be multiple hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller configured to control a vehicle equipped with an engine, the engine including a signal rotor and a crank position sensor, the signal rotor including teeth each arranged at a specified angle on an outer edge of the signal rotor and including a tooth-missing portion where the teeth are missing on a part of the outer edge, the crank position sensor facing the outer edge of the signal rotor coupled to a crankshaft of the engine, the crank position sensor sending a pulse signal each time one of the teeth passes, and the crank position sensor sending the pulse signal having a pulse width that differs depending on whether the crankshaft is rotating forward or backward, the vehicle controller comprising:

processing circuitry configured to execute:
a counter updating process that
increases and updates a crank counter in response to receiving the pulse signal from the crank position sensor, and
corrects, in response to determining that the crankshaft is rotating backward based on the pulse width of the pulse signal, the crank counter so as to set the crank counter to be smaller than a pre-update crank counter;
in a case in which a value of the crank counter obtained when the engine was stopped is not stored, a first starting process that starts the engine by setting fuel injection timings and ignition timings of cylinders of the engine after a crank angle is identified during cranking so that the crank counter is allowed to be updated;
in a case in which the value of the crank counter obtained when the engine was stopped is stored, a second starting process that starts the engine by setting the fuel injection timings and the ignition timings of the cylinders of the engine based on the stored value of the crank counter; and
a resetting process that
resets the crank counter by determining that a shift has occurred in the crank counter, in response to the crank counter having a value outside of a range corresponding to the tooth-missing portion in a case in which a magnitude of a difference obtained by subtracting a value of the pre-update crank counter from the value of the crank counter that was increased by receiving the pulse signal in the counter updating process is greater than a first threshold value corresponding to the specified angle, and
resets the crank counter by determining that the shift has occurred in the crank counter in response to the crank counter having a value within the range corresponding to the tooth-missing portion in a case in which the magnitude of the difference is greater than a second threshold value that is greater than the first threshold value.

2. The vehicle controller according to claim 1, wherein the teeth include two teeth that are respectively located on opposite sides of the tooth-missing portion, and the second threshold value is a value corresponding to a crank angle obtained from when one of the two teeth is detected by the crank position sensor to when the other one of the two teeth is detected by the crank position sensor.

3. The vehicle controller according to claim 1, wherein the processing circuitry is configured to prevent the crank counter from being reset although the crank counter is not shifted from an actual crank angle.

4. The vehicle controller according to claim 3, wherein the teeth include two teeth that are respectively located on opposite sides of the tooth-missing portion, and
the second threshold value is a value corresponding to a crank angle obtained from when one of the two teeth is detected by the crank position sensor to when the other one of the two teeth is detected by the crank position sensor.

5. A method for controlling a vehicle equipped with an engine, the engine including a signal rotor and a crank position sensor, the signal rotor including teeth each arranged at a specified angle on an outer edge of the signal rotor and including a tooth-missing portion where the teeth are missing on a part of the outer edge, the crank position sensor facing the outer edge of the signal rotor coupled to a crankshaft of the engine, the crank position sensor sending a pulse signal each time one of the teeth passes, and the crank position sensor sending the pulse signal having a pulse width that differs depending on whether the crankshaft is rotating forward or backward, the method comprising:
increasing and updating a crank counter in response to receiving the pulse signal from the crank position sensor and correcting, in response to determining that the crankshaft is rotating backward based on the pulse width of the pulse signal, the crank counter so as to set the crank counter to be smaller than a pre-update crank counter;
in a case in which a value of the crank counter obtained when the engine was stopped is not stored, starting the engine by setting fuel injection timings and ignition timings of cylinders of the engine after a crank angle is identified during cranking so that the crank counter is allowed to be updated;
in a case in which the value of the crank counter obtained when the engine was stopped is stored, starting the engine by setting the fuel injection timings and the ignition timings of the cylinders of the engine based on the stored value of the crank counter; and
resetting the crank counter by determining that a shift has occurred in the crank counter, in response to the crank counter having a value outside of a range corresponding to the tooth-missing portion in a case in which a magnitude of a difference obtained by subtracting a value of the pre-update crank counter from the value of the crank counter that was increased by receiving the pulse signal is greater than a first threshold value corresponding to the specified angle, and resetting the crank counter by determining that the shift has occurred in the crank counter, in response to the crank counter having a value within the range corresponding to the tooth-missing portion in a case in which the magnitude of the difference is greater than a second threshold value that is greater than the first threshold value.

6. The method of claim 5, further comprising preventing the crank counter from being reset although the crank counter is not shifted from an actual crank angle.

7. The method of claim 6, wherein
the teeth include two teeth that are respectively located on opposite sides of the tooth-missing portion, and
the second threshold value is a value corresponding to a crank angle obtained from when one of the two teeth is detected by the crank position sensor to when the other one of the two teeth is detected by the crank position sensor.

* * * * *